Oct. 8, 1968     D. B. GREEN     3,404,863

AEROSOL VALVE ASSEMBLY

Filed June 24, 1966

United States Patent Office 3,404,863
Patented Oct. 8, 1968

3,404,863
AEROSOL VALVE ASSEMBLY
Derek B. Green, 186 Roysan St.,
Manchester, N.H. 03103
Filed June 24, 1966, Ser. No. 560,169
4 Claims. (Cl. 251—170)

This present invention relates to an aerosol valve assembly for closing the top of a pressure fluid container. It constitutes an improvement on the assembly disclosed in the patent to Briechle 3,158,298.

The Briechle valve has been made and used extensively and in general, it is highly efficient. One of the ways in which it differs from other aerosol valve assemblies is the provision of fluid passage-ways around and over the valve housing to allow for quick filling. This, of course, does not permit the sealing washer to be clamped around its outer edge as in other valves. Great care has been required in the manufacture and assembling of the rubber sealing washers in order to prevent slow leakage, especially between the top surface of the washer and the cap. The washers must have a smooth surface finish and care must be taken to remove any dirt and to avoid ingress of dirt during assembling.

The principal object of this invention, therefore, is to provide an improved construction which will reduce the possibility of slow leakage, especially over the top of the washer and to reduce somewhat the over-all requirements in surface finish and cleanliness, by making these latter factors less critical. This is preferably accomplished by the simple and inexpensive expedient of an annular deformation in the top wall of the cap directly opposite the sealed rim of the valve. This deformation is preferably shaped to produce two areas of highly concentrated pressure across the washer so as to give a much more effective seal or multiple seal without any increase in the applied load, which, in turn, would require an unduly stiff spring.

In the accompanying drawing, I have shown for the purpose of illustration one embodiment which the invention may assume in practice. In the drawing.

Figure 1:
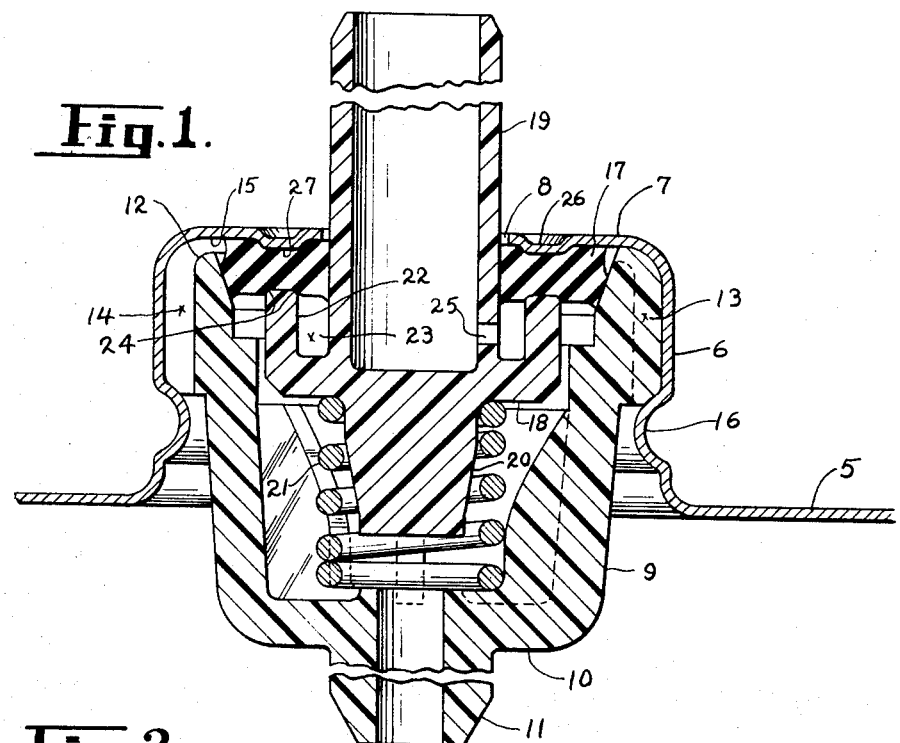
FIG. 1 is a diametric vertical section through my improved valve assembly.
Figure 2:
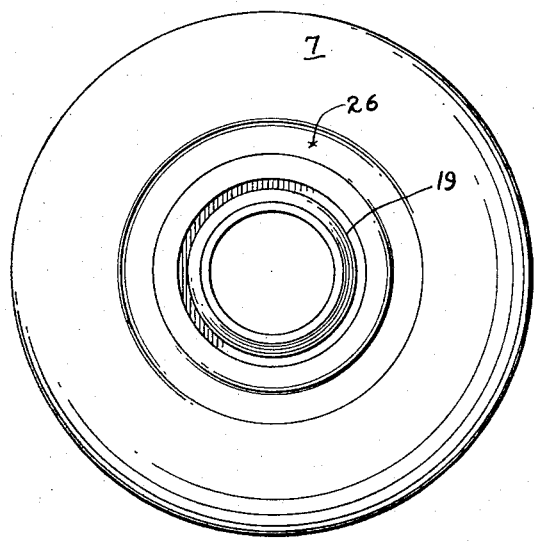
FIG. 2 is a top plan view.

The assembly is generally like that of the Briechle valve shown in the above-mentioned patent and it will be useful to describe in detail only those features which enter into combination with the deformation in the cap to produce the desired result.

The container closure or cap 5 has a neck with a cylindrical wall 6 and a top wall 7 which is provided with a central aperture 8. The valve housing is in the shape of a cup 9 having a solid bottom 10 with a connection 11 for the dip tube. Around the rim of the cup and extending over its top edge 12 are a series of ribs 13 with grooves or flutes 14 between them providing passageway means allowing direct communication between the space immediately below the inner surface 15 of the top wall 7, and the container interior.

The valve housing is firmly anchored in the cap by indentations 16 engaging under the ribs 13, such indentations being at spaced locations around the cylindrical wall 6. The sealing washer 17, which also functions as a valve seat, is made of elastic material, such as rubber. It has smooth flat top and bottom surfaces with the top surface bearing against the top wall 7 of the cap. The valve itself is molded from suitable plastic material and has a closed bottom 18, a tubular stem 19 extending upwardly through the hole in the washer and through the hole 8 in the cap. The valve also carries a depending pin 20 to receive a coil spring 21. The spring is under constant compression between the bottom of the housing cup and the bottom wall of the valve to create substantial upward thrust at all times.

The seal rim 22 of the valve is in the form of an upstanding circular flange spaced radially from the stem 19 to create an annular channel 23. The seal rim is generally rectangular in cross section and its upper edge is shown in this instance as being generally flat but having two radiused corners 24. The hole in the washer is only of such size as to snugly embrace the stem 19 while the aperture 8 in the cap is somewhat larger to allow for tilting of the stem and for flow of material around the stem for quick filling. When the valve is tilted or depressed, the contents will be discharged between the seal rim and washer 17, into the channel 23, hole 25 and into the stem which leads to a suitable spray button.

The outer diameter of the channel 23 is substantially larger than that of the hole 8 in the cap, and that portion of the top wall of the cap directly opposite the seal rim 22, is deformed inwardly providing a shallow flat bottomed groove 26 extending entirely around the cap and in vertical alignment with the seal rim 22. This results in a rib 27 projecting below the inner surface 15 of the cap with radiused corners 28 at the inner and outer edges of the rib. The rib is preferably about the same width as the thickness of the seal rim or flange 22 so that the radiused corners 24 are directly opposite the corners 28.

Figure 3:
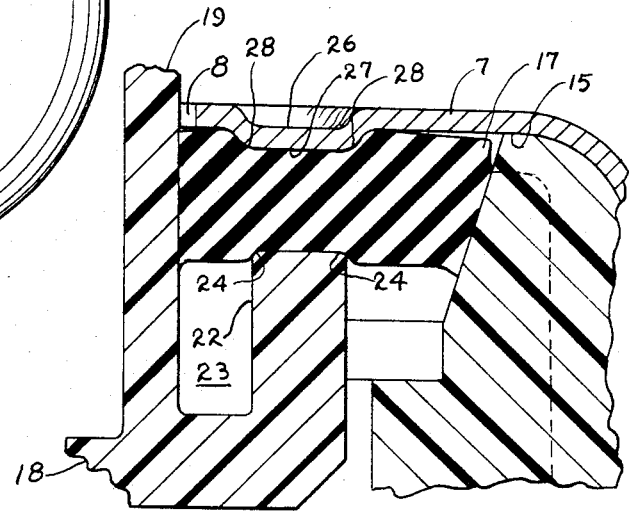
FIG. 3 is a schematic detailed section on an enlarged scale illustrating the functioning of the seal under pressure.

The upper thrust of the spring 21, will, of course, place a load on the sealing washer 17 which will necessarily be highly concentrated in the narrow areas adjacent the radiused corners. As seen in FIG. 3, the outer portion of the washer may relieve or more slightly away from the cap. Because of a concentration of the applied load in a narrow area or areas, the resulting sealing effect is much greater than if the loading force of the spring 21 were applied on the normal smooth flat surface of the cap. Actually, with the construction shown, the sealing is doubly positive because of the two areas of concentration or deformation of the rubber around the inner and outer edges of the cap 27. It will also be evident with my improved construction that leakage is effectively prevented without undue requirements as to surface finish or complete absence of dust particles.

What I claim is:
1. In an aerosol valve assembly for closing the top of a pressure fluid container having
 (a) a cap with a cylindrical wall and a top wall, the top wall having a central aperture;
 (b) a valve housing in the form of a cup anchored firmly in said cap and having passageway means around the rim and over the top edge of said cup providing communicaiton between the container and the inner surface of said top wall of the cap;
 (c) a sealing washer of elastic material having smooth flat top and bottom surfaces, the top surface normally bearing directly against the inner surface of said top wall of the cap;
 (d) a valve having a closed bottom, a tubular stem extending upwardly through said hole in the washer and said aperture in the cap, and a seal rim in the form of an annular flange projecting upwardly from said closed bottom, said rim being spaced radially from said stem to form an annular channel between them, the outer diameter of said channel being substantially larger than the diameter of said aperture in the cap, the hole in the washer being aligned with said aperture and being of such size as to make a snug fit around said stem; and
 (e) spring means housed within said cup and exerting upward thrust on said valve to force said seal rim into engagement with said sealing washer and said washer in turn against said inner surface of said cap top wall; that improvement which consists of an annular downward deformation of said cap top wall directly across from or in vertical alignment with said seal rim to concentrate the upward thrust of said spring and increase deformation of the top surface of said washer in at least one narrow circular zone to insure against leakage between said washer and the cap.

2. In an aerosol valve assembly, the improvement defined in claim 1, wherein said annular deformation includes a circular rib projecting below said surface of the top wall of the cap, said rib having a plurality of radiused corners presented to said sealing washer.

3. In an aerosol valve assembly, the improvement defined in claim 2, wherein said seal rim is shaped to provide a plurality of radiused corners directly opposite or in vertical alignment with said corners of said rib.

4. In an aerosol valve assembly, the improvement defined in claim 2, wherein said seal rim is generally rectangular in cross section and of substantially the same thickness as the width of said circular rib.

References Cited

UNITED STATES PATENTS

| | | | |
|---|---|---|---|
| 2,582,262 | 1/1952 | Loven et al. | 251—354 X |
| 2,932,432 | 4/1960 | Beard | 222—402.2 |
| 3,054,536 | 9/1962 | Sagarin | 222—402.2 |
| 3,121,517 | 2/1964 | Geary et al. | 251—353 X |
| 3,158,297 | 11/1964 | Ferry et al. | 251—353 X |
| 3,158,298 | 11/1964 | Briechle | 251—353 X |
| 3,277,674 | 10/1966 | Klein et al. | 141—20 X |

FOREIGN PATENTS

| | | |
|---|---|---|
| 722,495 | 11/1965 | Canada. |
| 638,703 | 4/1962 | Italy. |

M. CARY NELSON, *Primary Examiner.*

ROBERT C. MILLER, *Assistant Examiner.*

UNITED STATES PATENT OFFICE
CERTIFICATE OF CORRECTION

Patent No. 3,404,863                          October 8, 1968

Derek B. Green

It is certified that error appears in the above identified patent and that said Letters Patent are hereby corrected as shown below:

In the heading to the printed specification, lines 3 and 4, "186 Roysan St., Manchester, N. H. 03103" should read -- Manchester, N. H., assignor to Scovill Manufacturing Company, Waterbury, Conn., a corporation of Connecticut --.

Signed and sealed this 24th day of February 1970.

(SEAL)
Attest:

Edward M. Fletcher, Jr.                      WILLIAM E. SCHUYLER, JR.
Attesting Officer                               Commissioner of Patents